United States Patent
Maricic

(10) Patent No.: US 11,131,366 B2
(45) Date of Patent: Sep. 28, 2021

(54) BELT TENSIONER

(71) Applicant: Schaeffler Technologies AG & Co. KG, Herzogenaurach (DE)

(72) Inventor: Zoran Maricic, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 237 days.

(21) Appl. No.: 16/326,729

(22) PCT Filed: Sep. 7, 2017

(86) PCT No.: PCT/DE2017/100748
§ 371 (c)(1),
(2) Date: Feb. 20, 2019

(87) PCT Pub. No.: WO2018/054422
PCT Pub. Date: Mar. 29, 2018

(65) Prior Publication Data
US 2019/0203811 A1     Jul. 4, 2019

(30) Foreign Application Priority Data
Sep. 20, 2016   (DE) .......................... 102016217933.0

(51) Int. Cl.
*F16H 7/08*      (2006.01)
(52) U.S. Cl.
CPC ....... *F16H 7/08* (2013.01); *F16H 2007/0806* (2013.01); *F16H 2007/0808* (2013.01);
(Continued)
(58) Field of Classification Search
CPC .............. F16H 7/08; F16H 2007/0863; F16H 2007/0865; F16H 2007/0874;
(Continued)

(56) References Cited

U.S. PATENT DOCUMENTS 6,648,783 B1* 11/2003 Bogner ................. F16H 7/1281
                                                           474/134
9,103,411 B2* 8/2015 Wolf ...................... F02B 67/06
(Continued)

FOREIGN PATENT DOCUMENTS

CN       1502023 A    6/2004
CN    101634353 A    1/2010
(Continued)

OTHER PUBLICATIONS

DE102008026064A1 Translation; Ashauer et al; Belt Tensioner Arrangement For Belt Drive Utilized For Driving Auxiliary Devices of Internal-Combustion Engine; published: Dec. 10, 2009; Espacenet (Year: 2009).*

*Primary Examiner* — Michael R Mansen
*Assistant Examiner* — Raveen J Dias
(74) *Attorney, Agent, or Firm* — Reid A. Baldwin

(57) ABSTRACT

A belt tensioner controls the pretension of a belt for an ancillary component such as a starter/generator. The ancillary component may apply torque in each direction at different times. The starter/generator has a generator shaft and a generator belt pulley around which the belt passes. A flange is fixed to the starter/generator with a bearing sleeve which surrounds the generator shaft. A first tensioning arm and a second tensioning arm are each formed as circular rings and mounted on the bearing sleeve so as to pivot against each other. One tensioning arm is supported on an inner side of the bearing sleeve while the other tensioning arm is supported on the outer side of the bearing sleeve. Two tensioning rollers are mounted on the tensioning arms and apply a pretensioning force to the belt before and after the generator belt pulley in the belt running direction.

16 Claims, 7 Drawing Sheets

(52) U.S. Cl.
CPC .............. *F16H 2007/0865* (2013.01); *F16H 2007/0874* (2013.01); *F16H 2007/0893* (2013.01)

(58) Field of Classification Search
CPC ..... F16H 2007/0893; F16H 2007/0806; F16H 2007/0808; F16H 7/1281
See application file for complete search history.

(56) References Cited

U.S. PATENT DOCUMENTS

| | | | |
|---|---|---|---|
| 9,416,853 B2* | 8/2016 | Wolf | F02B 67/06 |
| 2003/0008739 A1 | 1/2003 | Asbeck et al. | |
| 2008/0020876 A1 | 1/2008 | Tanaka | |
| 2013/0040770 A1* | 2/2013 | Wolf | F16H 7/1281 474/134 |
| 2013/0079185 A1* | 3/2013 | Schauerte | F16H 7/1281 474/135 |
| 2013/0095967 A1* | 4/2013 | Wolf | F16H 7/1281 474/135 |
| 2013/0203535 A1* | 8/2013 | Mack | F16H 7/129 474/134 |
| 2014/0315673 A1* | 10/2014 | Zacker | F16H 7/12 474/135 |
| 2015/0285344 A1* | 10/2015 | Buchen | F16H 7/12 474/135 |
| 2015/0345597 A1* | 12/2015 | Walter | F02B 67/06 474/134 |
| 2015/0369347 A1* | 12/2015 | Wolf | F16H 7/1281 474/134 |
| 2016/0146312 A1* | 5/2016 | Pfeifer | F16H 7/08 474/135 |
| 2017/0009850 A1* | 1/2017 | Hartmann | F02B 67/06 |
| 2017/0082176 A1* | 3/2017 | Buchen | F16H 7/1281 |
| 2017/0146100 A1* | 5/2017 | Walter | F02B 67/06 |
| 2018/0135732 A1* | 5/2018 | Hartmann | F16H 7/1218 |
| 2018/0156317 A1* | 6/2018 | Maricic | F16H 7/1218 |
| 2018/0172117 A1* | 6/2018 | Arneth | F16H 7/08 |
| 2018/0202521 A1* | 7/2018 | Reuschel | F16H 7/1218 |
| 2018/0320765 A1* | 11/2018 | Hauck | F02B 67/06 |
| 2019/0017579 A1* | 1/2019 | Stadermann | F16H 7/1281 |
| 2019/0040937 A1* | 2/2019 | Van Ruiten | C08K 7/14 |
| 2019/0145501 A1* | 5/2019 | Singh | F16H 7/1281 474/134 |
| 2019/0162276 A1* | 5/2019 | Svamberk | F16H 7/02 |

FOREIGN PATENT DOCUMENTS

| | | |
|---|---|---|
| CN | 103016659 A | 4/2013 |
| CN | 103062346 A | 4/2013 |
| CN | 103375557 A | 4/2013 |
| CN | 104033552 A | 9/2014 |
| CN | 104220780 A | 12/2014 |
| DE | 19926615 A1 | 12/2000 |
| DE | 102008026064 A1 | 12/2009 |
| DE | 102011082764 A1 | 4/2012 |
| DE | 102012209028 A1 | 12/2013 |
| DE | 102012223086 A1 | 6/2014 |
| DE | 102013002993 A1 | 8/2014 |
| DE | 102013102562 A1 | 9/2014 |
| DE | 102014117094 A1 | 5/2016 |
| EP | 1437528 A2 | 7/2004 |
| EP | 2128489 A2 | 12/2009 |
| EP | 2778472 A1 | 9/2014 |
| EP | 3023670 A1 | 5/2016 |
| WO | 0140682 A1 | 6/2001 |

* cited by examiner

BELT TENSIONER

CROSS-REFERENCE TO RELATED APPLICATIONS

This application is the U.S. National Phase of PCT Appln. No. PCT/DE2017/100748 filed Sep. 7, 2017, which claims priority to DE 10 2016 217 933.0 filed Sep. 20, 2016, the entire disclosures of which are incorporated by reference herein.

TECHNICAL FIELD

The disclosure concerns a belt tensioner for a belt drive for an ancillary component. More particularly, the disclosure concerns a belt tensioner with two tensioning arms formed as circular rings.

BACKGROUND

Generic belt tensioners, which are mounted on a starter-generator of an internal combustion engine and pass around the generator shaft, with two tensioning arms in the form of circular rings, are described in various structural forms in EP 2 128 489 B1, DE 10 2012 223 086 A1 and DE 10 2013 102 562 A1 for example.

In comparison with alternative designs in which one of the tensioning arms is not formed as a circular ring but as an arc and is mounted in a corresponding cavity of the other tensioning arm, these belt tensioners have a considerable advantage in relation to the stiffness of the tension arm mounting. Because of the design, the rocking play of an arcuate tensioning arm, as known for example from DE 10 2013 002 993 A1, is significantly greater than the rocking play in annular tensioning arms.

SUMMARY

A first tensioning arm bears radially against an inner casing of a bearing sleeve, and a second tensioning arm bears radially against an outer casing of the bearing sleeve. In other words, the mounting of the two tensioning arms equates to a series arrangement of bearing components in the radial sequence: first tensioning arm-bearing sleeve-second tensioning arm. The prior art cited initially discloses only mountings with the radial sequence: bearing sleeve-first tensioning arm-second tensioning arm, or conversely: first tensioning arm-second tensioning arm-bearing sleeve, when the mounting is viewed in the radially outward direction. With the tensioning arm mounting according to the disclosure, both tensioning arms are mounted with bearing play only on the bearing sleeve. This causes the decisive stiffness advantage compared with known mountings, in which the tensioning arm remote from the bearing sleeve has two bearing plays, namely it can tilt about both bearing plays radially on both sides of the tensioning arm adjacent to the bearing sleeve.

A further advantage of the mounting according to the disclosure may be an improved heat transmission behavior. The heat generated by the bearing friction is in each case transmitted over a relatively short, i.e. direct, transmission path from the tensioning arm to the bearing sleeve, where it is dissipated. This reduces the temperature load on plastic coatings which, in an embodiment of the disclosure, serve as a plain bearing between the tensioning arms and the bearing sleeve.

The plain bearings may be configured as rings, the circumferential edges of which are formed partly or fully as elastically deformed sealing lips. The sealing lips prevent the penetration of dirt, abrasion and splash water into the respective plain bearing contact.

Further features and advantages are evident from the description below and from the drawings, which show two exemplary embodiments of a belt tensioner for a belt drive for an ancillary component of an internal combustion engine. Unless specified otherwise, the same features or components, or those with similar function, carry the same reference signs.

DETAILED DESCRIPTION

Figure 1:
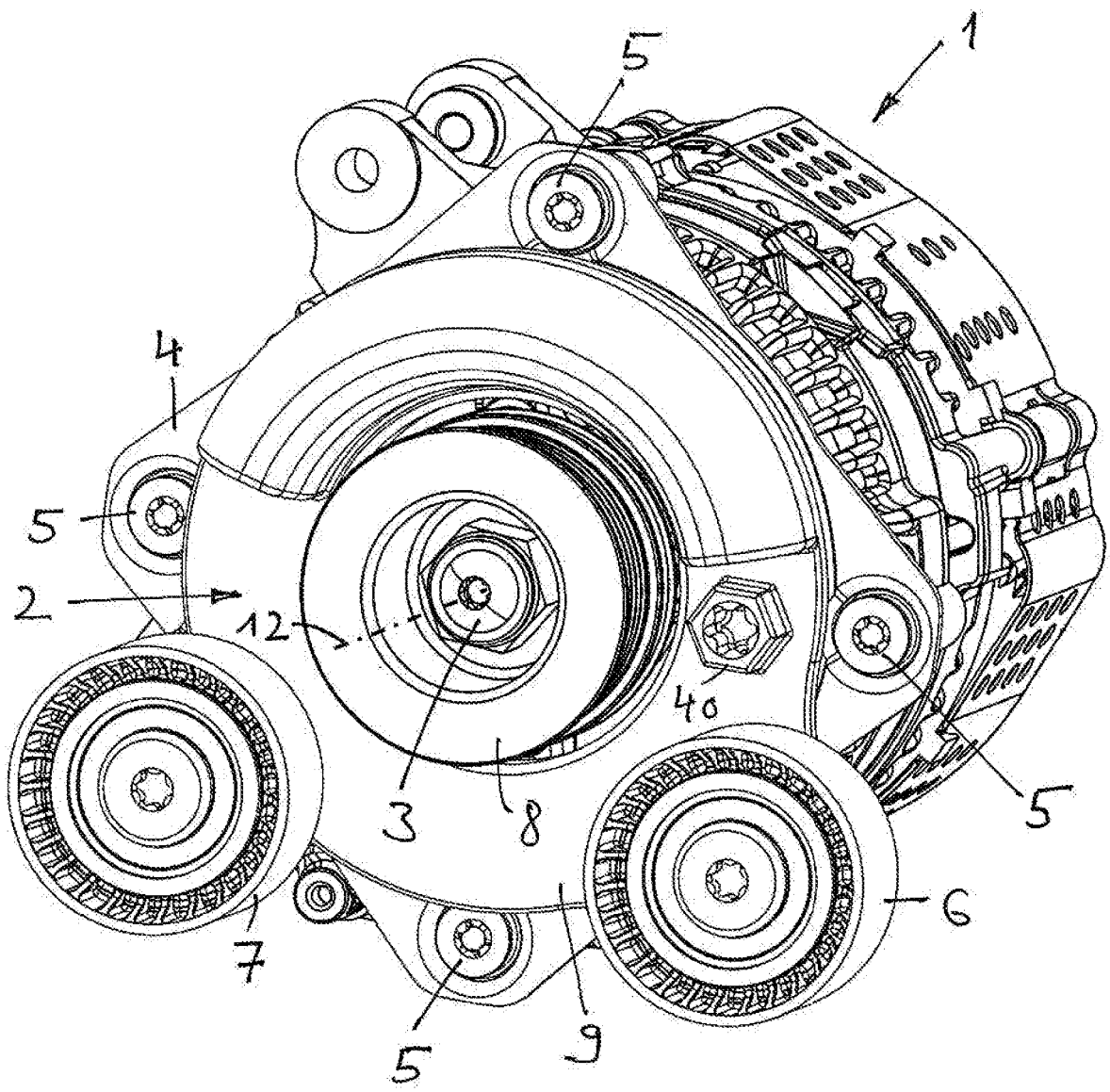
FIG. 1 in perspective view, the first belt tensioner mounted on a starter-generator.
Figure 2:
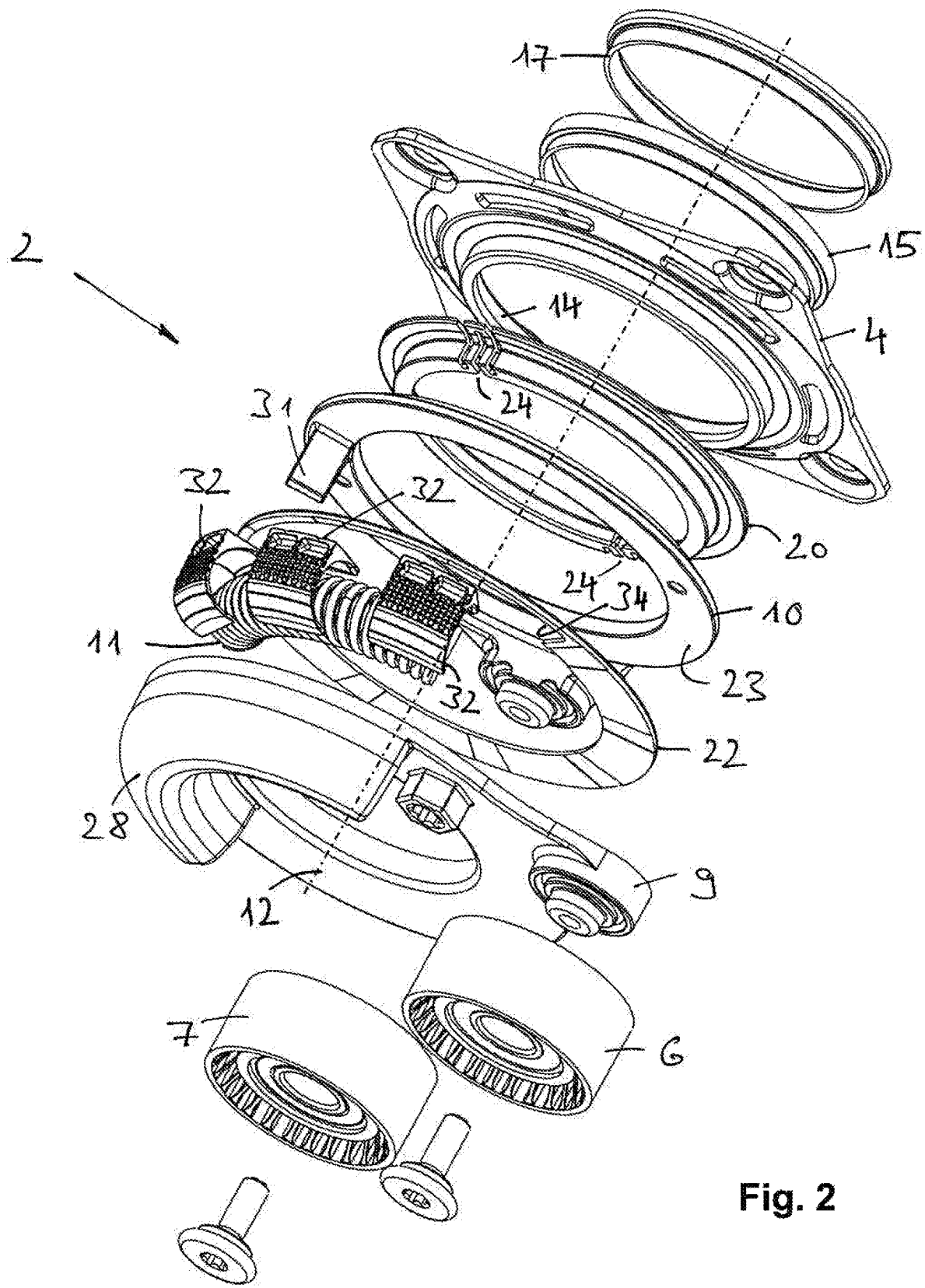
FIG. 2 the first belt tensioner in perspective, exploded depiction.
Figure 3:
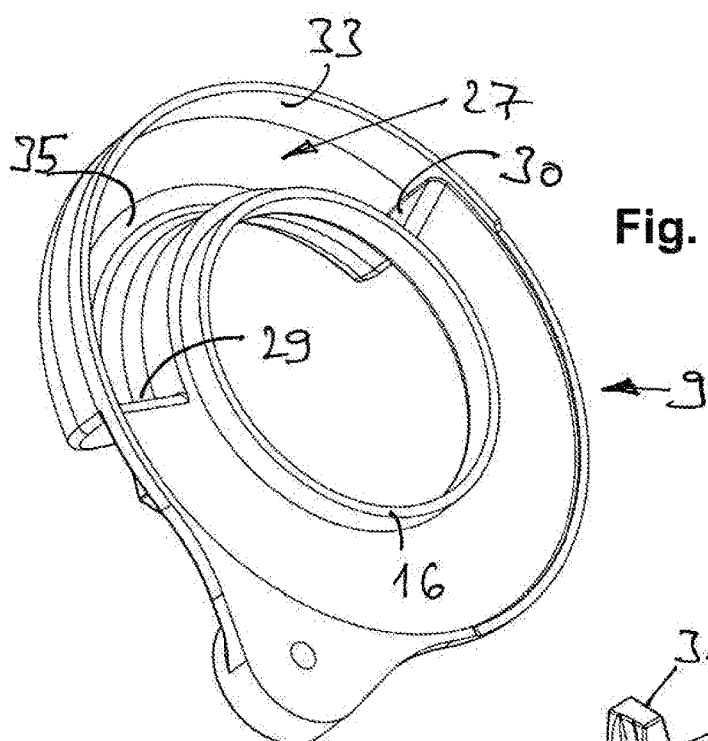
FIG. 3 the first tensioning arm of the first belt tensioner in a perspective view onto the interior of the spring chamber.
Figure 4:
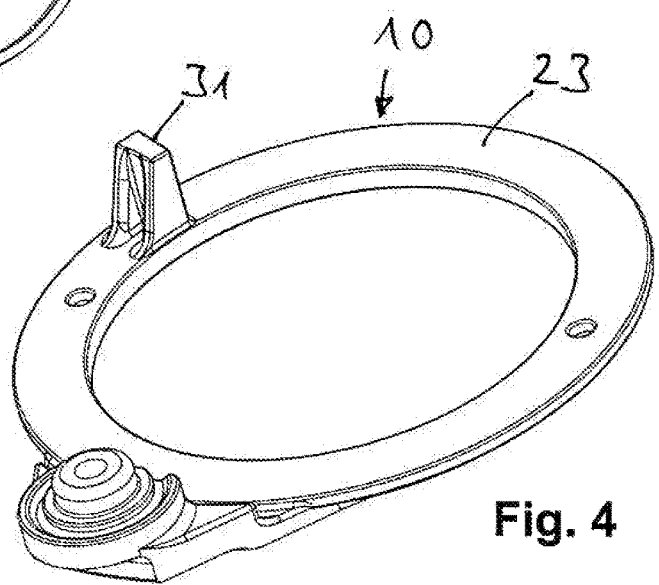
FIG. 4 the second tensioning arm of the first belt tensioner in a perspective view onto the carrier.
Figure 5:
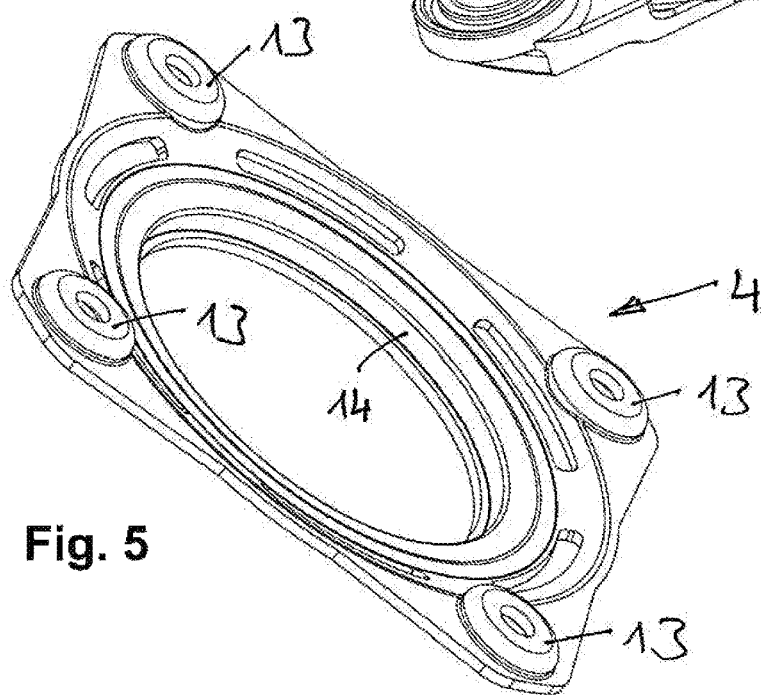
FIG. 5 the flange of the first belt tensioner in a perspective view onto its generator-side bolting plane.
Figure 6:
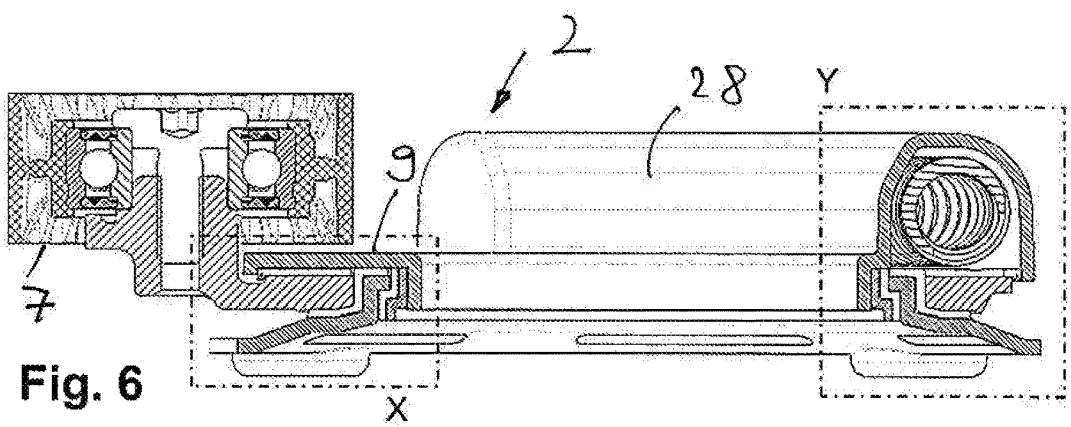
FIG. 6 the first belt tensioner in longitudinal section.
Figure 7:
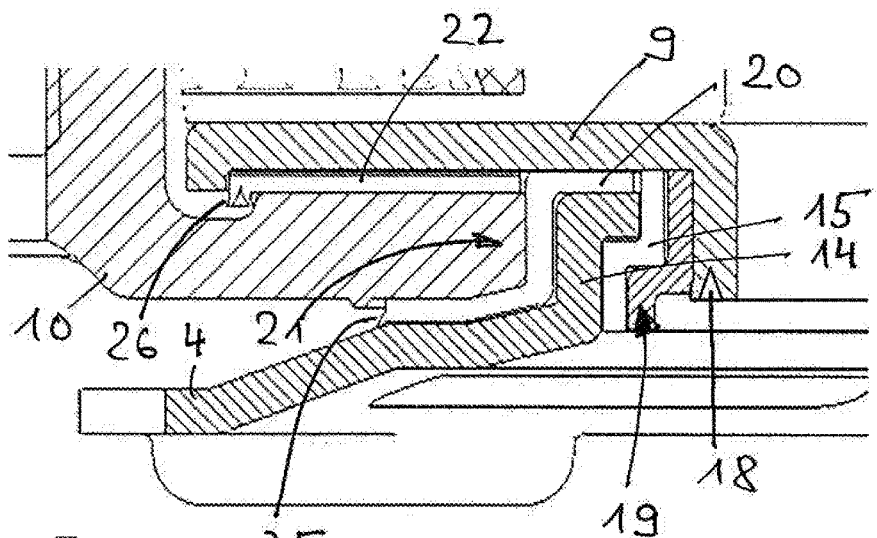
FIG. 7 the detail X from FIG. 6.
Figure 8:
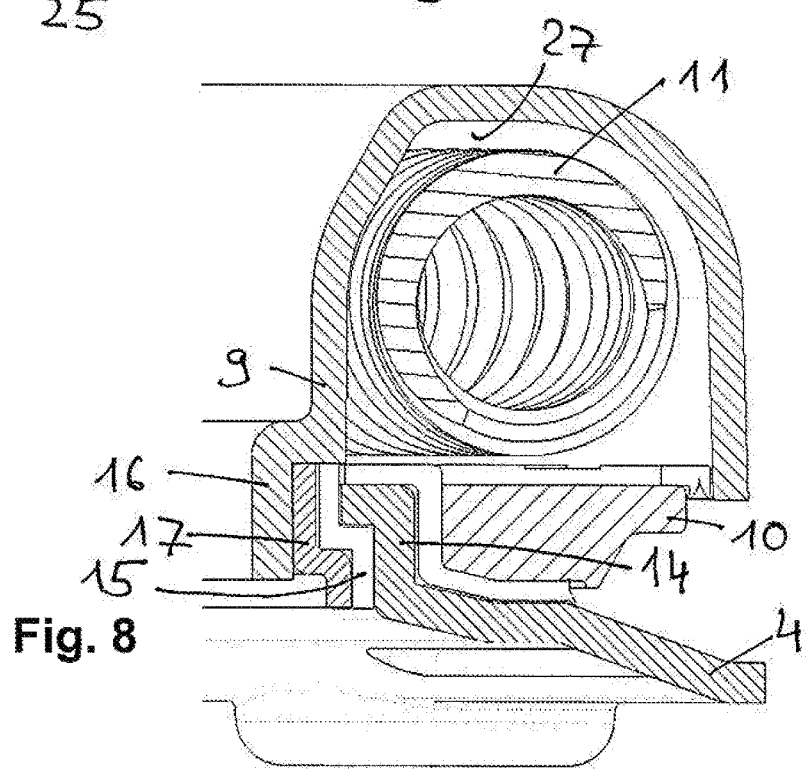
FIG. 8 the detail Y from FIG. 6.
Figure 9:
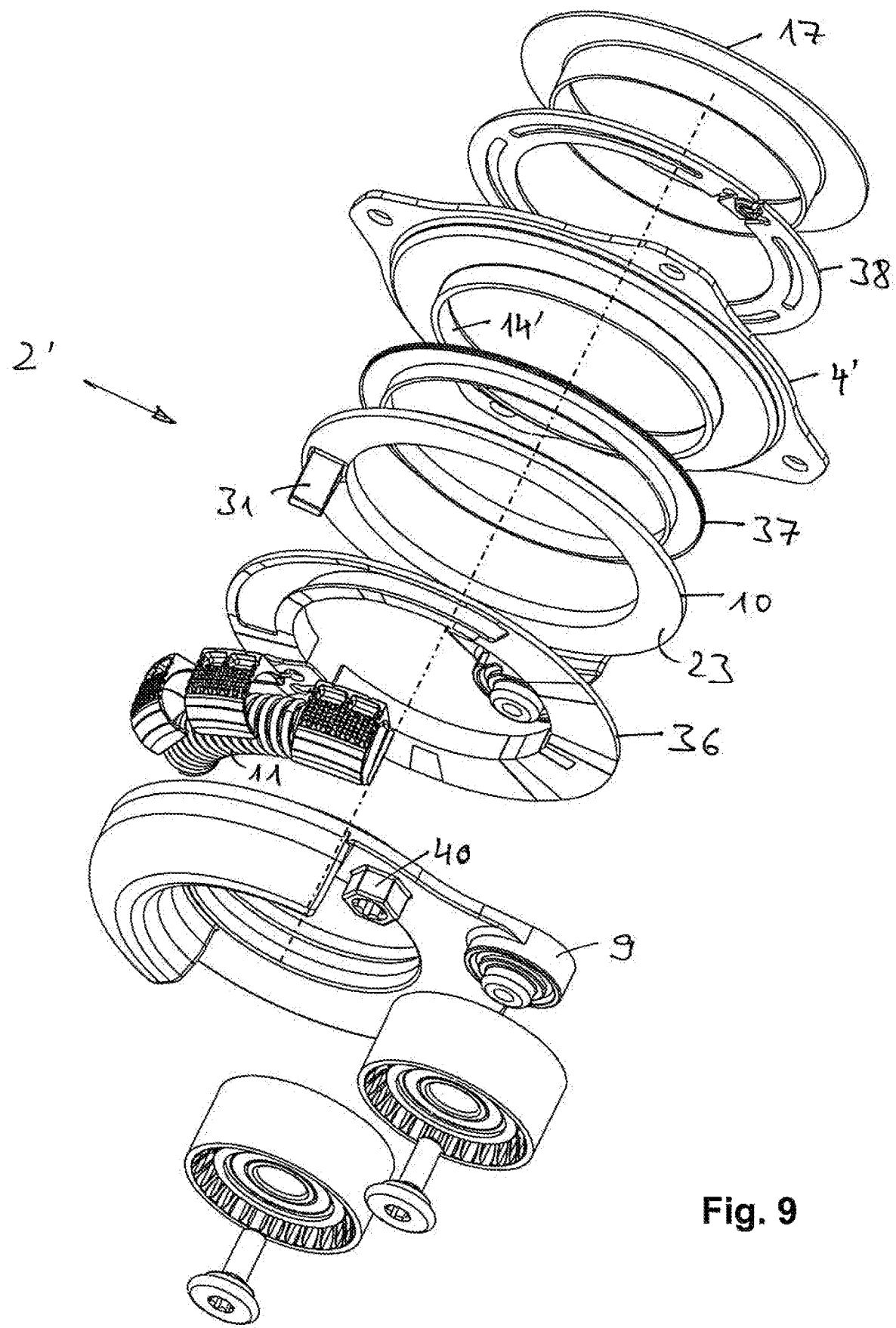
FIG. 9 the second belt tensioner in perspective, exploded depiction.
Figure 10:
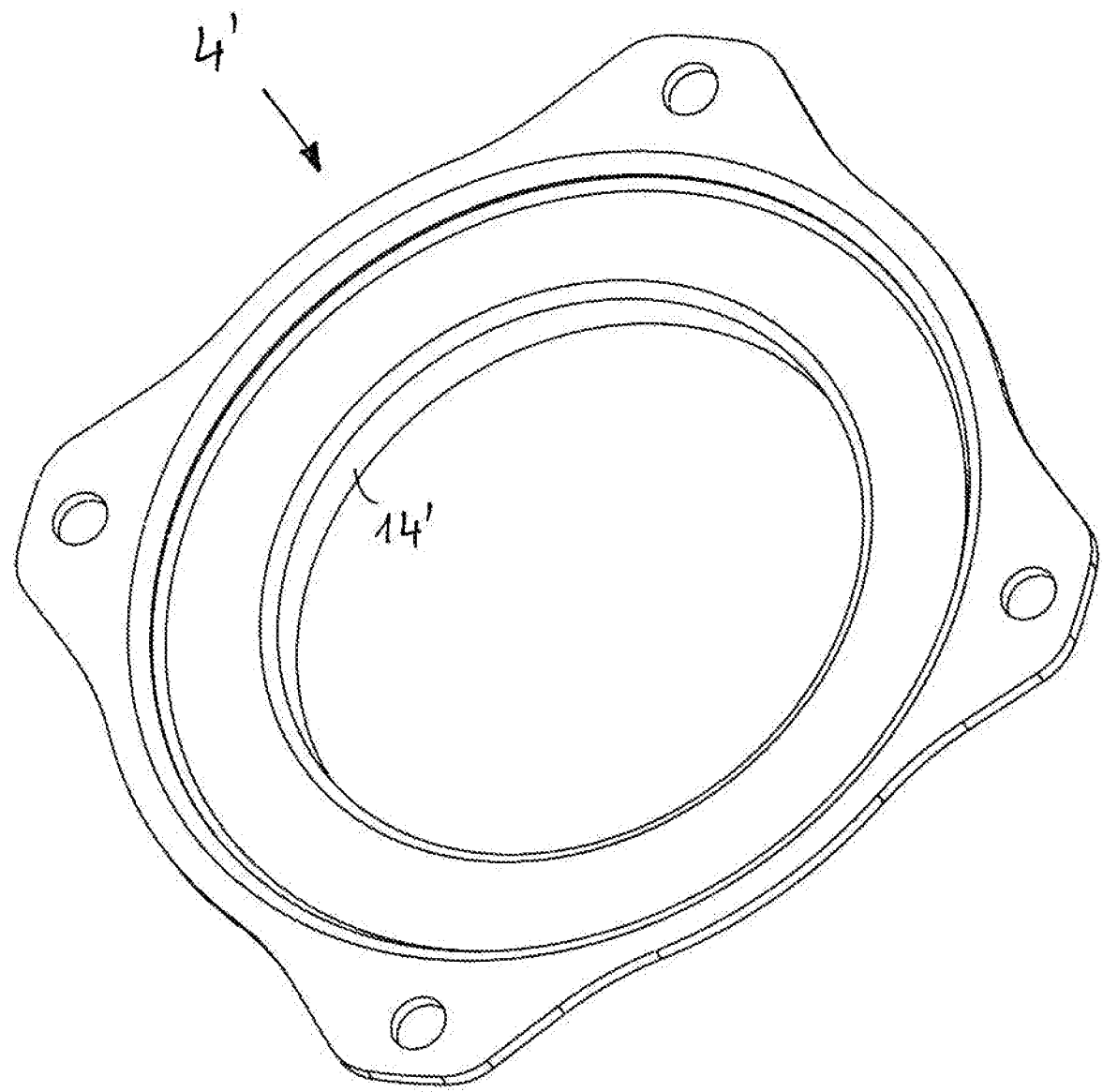
FIG. 10 the flange of the second belt tensioner in a perspective view onto its generator-side bolting plane.
Figure 11:
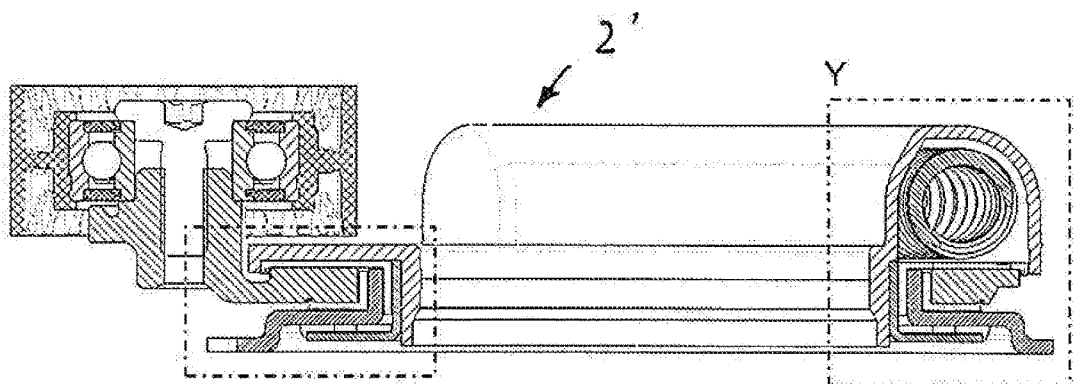
FIG. 11 the second belt tensioner in longitudinal section.
Figure 12:
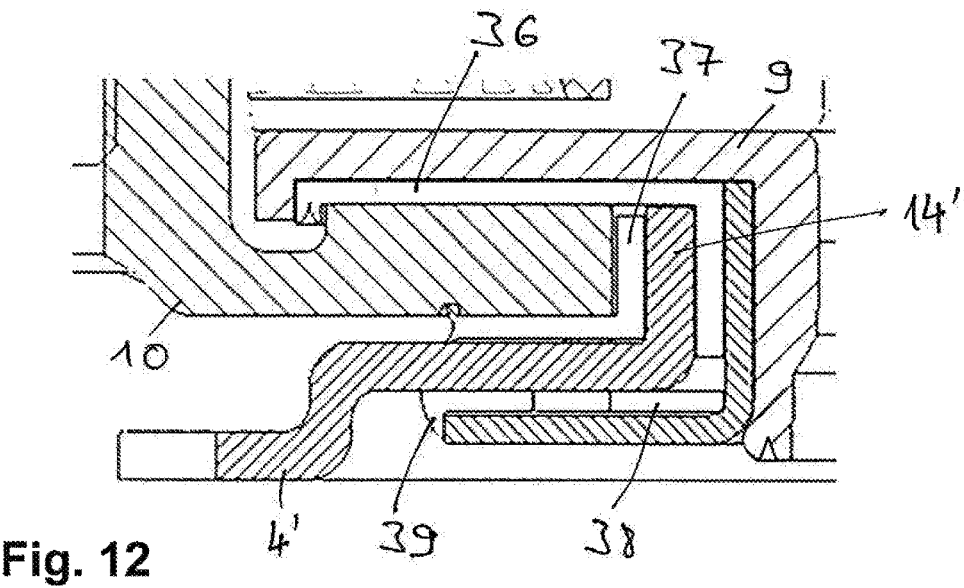
FIG. 12 the detail X from FIG. 11.
Figure 13:
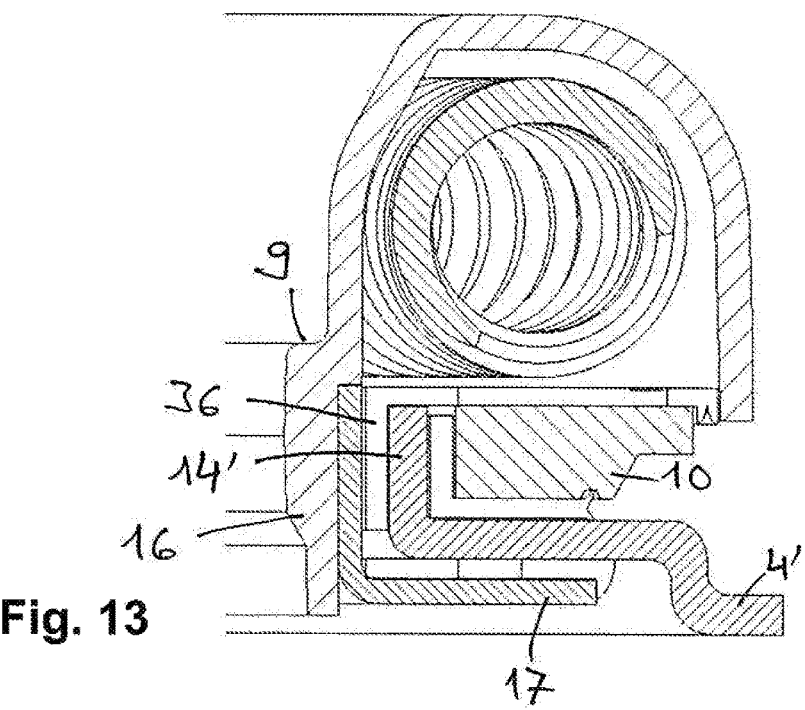
FIG. 13 the detail Y from FIG. 11.

FIG. 1 shows a generator 1 of a belt drive for an ancillary component of an internal combustion engine when assembled with the first exemplary embodiment of a belt tensioner 2, which is depicted in exploded view in FIG. 2. The generator 1 is configured as a starter-generator which serves not only to generate power but also for belt starting or boosting of the internal combustion engine, and in this case is operated as a driving motor. The belt tensioner 2 is attached at four bolting points 5 on the front, i.e. the belt-side part, of the generator 1 by means of a flange 4 surrounding the generator shaft 3. Belt tensioner 2 includes two tensioning rollers 6 and 7 which pretension the belt (not shown) before and after the generator belt pulley 8 in the belt running direction. The tensioning rollers 6, 7 are bolted to a first and second tensioning arm 9 and 10 respectively, each of which is configured as a closed circular ring and mounted on the flange 4 on plain bearings so as to be pivotable relative to each other and also relative to the generator 1. A spring 11 clamped between the tensioning arms 9, 10 causes the tensioning rollers 6, 7 to pretension the idle strand of the belt, which interchanges with the tension strand depending on the operating state of the generator 1. The pivot mounting of the tensioning arms 9, 10 in this case is concentric to the axis 12 of the generator shaft 3, but may alternatively be eccentric to the axis 12, as long as the generator belt pulley 8 and belt passing around this have adequate clearance from the belt tensioner 2.

The components of the belt tensioner 2 and their interaction is explained in more detail with reference to FIGS. 2 to 8, which should be viewed in parallel. The flange 4 is a punched and bent part of sheet metal, on which are formed a bearing sleeve 14 and four support faces 13 for bolting to the generator 1. In the plain bearing contact region, the flange has a substantially Z-shaped cross-sectional profile. The inner casing of the bearing sleeve 14 carries a plain bearing ring 15 which is fixed twist-resistantly thereto. The first tensioning arm 9 is produced as an aluminum die-cast component and has a cylindrical collar 16, the outer casing of which radially supports the first tensioning arm 9 against the inner casing of the bearing sleeve 14. This support is provided by means of a clamping sleeve 17 made of steel, the outer casing of which slides in the plain bearing ring 15. The clamping sleeve 17 holds the components of the belt tensioner 2 axially together; it is attached via a press fitting on the outer casing of the collar 16 and is additionally secured axially by an end-side caulking 18 of the collar 16.

The plain bearing ring 15 and the clamping sleeve 17, each with a substantially Z-shaped cross-sectional profile, form a radially extending step 19. This serves as an axial bearing with which the first tensioning arm 9 bears against the flange 4 in the axial direction facing away from the generator 1.

The second tensioning arm 10 is also an aluminum die-cast component, the cylindrical inner casing of which carries a plain bearing ring 20 fixed twist-resistantly thereto. This also has a substantially Z-shaped cross-sectional profile and forms an axially extending step 21, which supports the second tensioning arm 10 on its inner casing radially against the outer casing of the bearing sleeve 14. The two radially extending legs of the plain bearing ring 20 each serve as axial bearings which support the two tensioning arms 9 and 10 against the flange 4 in a parallel arrangement in the axial direction facing the generator 1.

The second tensioning arm 10 is supported axially against the first tensioning arm 9, in the axial direction facing away from the generator 1, by means of a substantially flat plain bearing ring 22 which is fixed twist-resistantly on the end face 23 of the second tensioning arm 10 facing away from the generator 1.

The plain bearing rings 15, 20 and 22 consist of polyamide 46 with embedded PTFE, and may have slots, in the manner for example of the plain bearing ring 20 which has slots 24. These increase the circumferential elasticity so that the plain bearing ring 20 adapts to its installation space with little force. The outer circumferential edges of the plain bearing rings 20 and 22 are each formed as sealing lips 25 and 26, which in mounted state of the plain bearing rings 20, 22 are easily deformed elastically and protect the interior of the respective plain bearing from the penetration of dirt or splash water.

The spring 11 producing the belt pretension is a bow spring which is received parallel to the belt plane in a correspondingly arcuate spring chamber 27. The latter is delimited axially firstly by a circumferentially arcuate bulge 28 of the first tensioning arm 9, and secondly by the end face 23 of the second tensioning arm 10, and with the spring 11 received therein runs in substantial axial overlap with the tensioning rollers 6, 7. The circumferential extension of the spring chamber 27 runs in the region of the generator belt pulley 8 around which the belt passes, and is delimited by two walls 29 and 30 at the circumferential ends of the bulge 28.

As is generally known, a bow spring is always a coil compression spring with arcuate, open longitudinal extension. The spring 11 may be produced either already in arcuate form, or alternatively as a straight coil compression spring which is only deformed into an arc when inserted in the spring chamber 27. The bow spring combines the relatively high form-usage value of a torsion spring with the circumferential restriction of the spring 11 to its arcuate installation space (the form-usage value compares the energy absorbed by a spring with the maximally possible amount of stored work for the same spring volume and the same material stress). This type of tensioner springing allows the favorable mounting geometry of the closed ring form of the tensioning arms 9, 10, because due to the sufficiently high spring capacity, the spring 11 can be positioned substantially without problems in the region of the generator belt pulley 8 around which the belt passes, and thus overlap axially with the tensioning rollers 6, 7. Also, the tensioning rollers 6, 7 and hence the belt plane may run with a comparatively small axial spacing from the generator 1, so that the moment loading on the front generator shaft bearing remains small.

In particular—except for the case in which a bow spring is required with a large arc angle which is unfavorable for the spring windings—two or more bow springs or straight coil compression springs in a series arrangement may be provided, and a spring chamber 27 with correspondingly adapted arc angle. Irrespective of this, parallel-arranged bow springs are also possible in the form of a spring packet with an outer and an inner bow spring. By means of these parameters, the global characteristics of the tensioner springing may be varied within broad limits.

The spring 11 is clamped between the one wall 29 of the first tensioning arm 9 and a carrier 31 of the second tensioning arm 10, in order to torque-load the two tensioning rollers 6, 7 relative to each other. The carrier 31 protrudes axially relative to the end face 23 and extends in front of the outer wall 30 into the spring chamber 27. Because the carrier 31 runs completely or at least mainly in axial overlap with the tensioning roller 7, the reaction force pair applied by the spring 11 and the tensioning roller 7 generates a comparatively small tilt moment in the pivot bearing of the second tensioning arm 10.

On the outer arc of the spring 11, three U-shaped sliding shoes 32 made of polyamide are fixed, which support the reaction force of the spring 11 in the radially outward direction and axially on at least one of the tensioning arms 9, 10. In the present case, the axial support exists on both tensioning arms 9, 10. The radial support is provided by the sliding contact of the sliding shoes 32 with the arcuate outer casing 33 of the spring chamber 27. The axial support, which prevents axial deflection or kinking of the spring 11, is provided firstly on the side of the generator 1 by the sliding contact of the substantially flat sliding shoe 32 with the end face 23, which in this contact region is exposed because of a recess 34 in the plain bearing ring 22. On the opposite side, the axial support is provided by the sliding contact of the sliding shoe 32 on the floor 35 of the spring chamber 27.

Due to the plurality of sliding contacts which, in the exemplary embodiment shown, are each formed by a plastic surface on one side and a metal surface on the other, there is extensive tolerance in the matching of the frictional and hence operational damping characteristics of the belt tensioner 2. When the sliding contacts are matched in regard to their respective material pairing, surface form and roughness and where applicable greasing, their relative movements must also be taken into account. These are greater for example between the sliding shoe 32 and the end face 23 of the second tensioning arm 10, if the sliding contact is viewed starting from the carrier 31 in the direction of the one wall 29. Conversely, the relative movements between the sliding shoes 32 on one side and the outer casing 33 and the floor 35 of the spring chamber 27 on the other are smaller.

The second exemplary embodiment of a belt tensioner 2' is illustrated in FIGS. 9 to 13 explained below. The two belt tensioners 2 and 2' differ essentially in the structural details of the tensioning arm pivot mounting. In this case, the flange 4' has a cross-sectional profile which is substantially L-shaped in the contact region to the plain bearing rings 36, 37 and 38. The clamping sleeve 17 attached in the collar 16 of the first tensioning arm 9, and the plain bearing rings 36, 37, also have a substantially L-shaped cross-sectional profile. The plain bearing ring 38 fixed twist-resistantly to the flange 4' is substantially flat apart from the sealing lip 39 of the outer periphery.

The clamping sleeve 17 slides with its outer casing in the plain bearing ring 36, which is fixed twist-resistantly on the end face 23 of the second tensioning arm 10 facing away from the generator and supports the first tensioning arm 9 at its collar 16 radially against the inner casing of the bearing sleeve 14'. The inner casing of the second tensioning arm 10 is supported radially against the outer casing of the bearing sleeve 14' by the plain bearing ring 37, which is also fixed twist-resistantly thereto. In the second exemplary embodiment, the tensioning arm mounting in the axial direction facing the generator is an axial series arrangement in the order: first tensioning arm 9-plain bearing ring 36-second tensioning arm 10-plain bearing ring 37-flange 4'.

The first tensioning arm 9 is supported against the flange 4' in the axial direction facing away from the generator 1 by means of the clamping sleeve 17 and plain bearing ring 38. In this axial direction, the second tensioning arm 10 is supported against the first tensioning arm 9 by means of the plain bearing ring 36.

The hexagon 40 formed on the first tensioning arm 9 serves for engagement of a mounting tool with which the two tensioning arms 9 and 10 can be spread apart from each other against the spring force, in order to be able to fix them in this position using a known locking device (not shown here), for belt installation.

LIST OF REFERENCE SIGNS

1 Generator
2 Belt tensioner
3 Generator shaft
4 Flange
5 Bolting point
6 Tensioning roller
7 Tensioning roller
8 Generator belt pulley
9 First tensioning arm
10 Second tensioning arm
11 Spring
12 Axis
13 Support face
14 Bearing sleeve
15 Plain bearing ring
16 Collar
17 Clamping sleeve
18 Caulking
19 Step
20 Plain bearing ring
21 Step
22 Plain bearing ring
23 End face of second tensioning arm
24 Slot
25 Sealing lip
26 Sealing lip
27 Spring chamber
28 Bulge
29 One wall
30 Other wall
31 Carrier
32 Sliding shoe
33 Outer casing of spring chamber
34 Recess
35 Floor of spring chamber
36 Plain bearing ring
37 Plain bearing ring
38 Plain bearing ring
39 Sealing lip
40 Hexagon

The invention claimed is:

1. A belt tensioner for a belt drive for an ancillary component, the ancillary component comprising a generator with a generator shaft and a generator belt pulley around which a belt passes, the belt tensioner comprising:
a flange fixed to the generator and having a bearing sleeve which surrounds the generator shaft;
a first tensioning arm and a second tensioning arm which are formed as circular rings and mounted on the bearing sleeve so as to pivot against each other, the first tensioning arm bearing radially against an inner casing of the bearing sleeve, and the second tensioning arm bearing radially against an outer casing of the bearing sleeve;
two tensioning rollers which are mounted on the tensioning arms and apply a pretensioning force to the belt before and after the generator belt pulley in a belt running direction; and
a bow spring clamped between the tensioning arms for producing the pretensioning force; and
wherein the tensioning arms delimit an arcuate spring chamber receiving the spring.

2. The belt tensioner of claim 1, wherein the first tensioning arm bears with a radially extending step and against the flange in an axial direction facing away from the generator, and the second tensioning arm bears against the first tensioning arm in the axial direction facing away from the generator and against the flange in an axial direction facing towards the generator.

3. The belt tensioner of claim 2, wherein the radially extending step is formed by a clamping sleeve which is attached to the first tensioning arm and supports the first tensioning arm radially against the inner casing of the bearing sleeve.

4. The belt tensioner of claim 3, wherein the clamping sleeve is attached to the first tensioning arm by a press-fit joint and caulking.

5. The belt tensioner of claim 1, further comprising plain bearing rings for pivot mounting of the tensioning arms, wherein at least one of the plain bearing rings has a circumferential edge which is formed as an elastically deformed sealing lip.

6. The belt tensioner of claim 1, wherein the arcuate spring chamber extends circumferentially in a region of the generator belt pulley around which the belt passes and is delimited by two walls of the first tensioning arm, the bow spring is clamped between one of the two walls and a carrier which is formed on the second tensioning arm and protrudes axially relative to an end face of the second tensioning arm facing away from the generator and extends into the arcuate spring chamber in front of the other wall.

7. The belt tensioner of claim 6, wherein the arcuate spring chamber and the tensioning rollers overlap in an axial direction.

8. The belt tensioner of claim 6, wherein one or more sliding shoes are fixed on a periphery of the bow spring and support a reaction force of the bow spring in a radially outward direction against an arcuate outer casing of the arcuate spring chamber, and in an axial direction facing away from the generator against a floor of the arcuate spring chamber and in an axial direction facing the generator against the end face of the second tensioning arm facing away from the generator.

9. A belt tensioner for a belt drive for an ancillary component, comprising:
- a flange adapted for fixation relative to the ancillary component and defining a bearing sleeve with an inner surface and an outer surface;
- a first tensioning ring rotatably mounted on the bearing sleeve and bearing radially against the inner surface of the bearing sleeve;
- a second tensioning ring rotatably mounted on the bearing sleeve and bearing radially against the outer surface of the bearing sleeve wherein the first and second tensioning rings delimit an arcuate spring chamber;
- a bow spring clamped between the first and second tensioning rings and contained in the arcuate spring chamber;
- a first tensioning roller rotatably mounted on the first tensioning ring; and
- a second tensioning roller rotatably mounted on the second tensioning ring, the first and second tensioning rollers configured to apply a pretensioning force to a belt in response to a force produced by the bow spring.

10. The belt tensioner of claim 9, further comprising a clamping sleeve attached to the first tensioning ring, the clamping sleeve defining a step which bears against the flange in an axial direction facing away from the ancillary component.

11. The belt tensioner of claim 10, wherein the second tensioning ring bears against the first tensioning ring in the axial direction facing away from the ancillary component and bears against the flange in an axial direction facing towards the ancillary component.

12. The belt tensioner of claim 10, wherein the clamping sleeve is attached to the first tensioning ring by a press-fit joint.

13. The belt tensioner of claim 9, further comprising:
- a first plain bearing ring between the first tensioning ring and the inner surface; and
- a second plain bearing ring between the second tensioning ring and the outer surface, the second plain bearing ring having a circumferential edge formed as an elastically deformed sealing lip.

14. A belt tensioner for a belt drive for an ancillary component, comprising:
- a flange adapted for fixation relative to the ancillary component and defining a bearing sleeve with an inner surface and an outer surface;
- a first tensioning arm pivotably mounted on the bearing sleeve and bearing radially against the inner surface of the bearing sleeve;
- a second tensioning arm pivotably mounted on the bearing sleeve and bearing radially against the outer surface of the bearing sleeve;
- a clamping sleeve attached to the first tensioning arm by a press-fit joint, the clamping sleeve defining a step which bears against the flange in an axial direction facing away from the ancillary component;
- a spring clamped between the first and second tensioning arms;
- a first tensioning roller rotatably mounted on the first tensioning arm; and
- a second tensioning roller rotatably mounted on the second tensioning arm, the first and second tensioning rollers configured to apply a pretensioning force to a belt in response to a force produced by the spring.

15. The belt tensioner of claim 14, wherein the second tensioning arm bears against the first tensioning arm in the axial direction facing away from the ancillary component and bears against the flange in an axial direction facing towards the ancillary component.

16. The belt tensioner of claim 14, further comprising:
- a first plain bearing ring between the clamping sleeve and the inner surface; and
- a second plain bearing ring between the second tensioning arm and the outer surface, the second plain bearing ring having a circumferential edge formed as an elastically deformed sealing lip.

* * * * *